(12) United States Patent
Garg et al.

(10) Patent No.: US 7,427,388 B2
(45) Date of Patent: Sep. 23, 2008

(54) PROCESS FOR IMPROVING PREREFORMING AND REFORMING OF NATURAL GAS CONTAINING HIGHER HYDROCARBONS ALONG WITH METHANE

(75) Inventors: Diwakar Garg, Emmaus, PA (US); Shankar Nataraj, Allentown, PA (US); John Nelson Armor, Orefield, PA (US); John Michael Repasky, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1037 days.

(21) Appl. No.: 10/804,536

(22) Filed: Mar. 19, 2004

(65) Prior Publication Data
US 2005/0207970 A1 Sep. 22, 2005

(51) Int. Cl.
*C01B 3/26* (2006.01)
(52) U.S. Cl. .................................. 423/653; 423/654
(58) Field of Classification Search ............... 423/653, 423/654
See application file for complete search history.

(56) References Cited

U.S. PATENT DOCUMENTS

| | | | |
|---|---|---|---|
| 3,988,425 | A | 10/1976 | Jockel et al. |
| 4,104,201 | A | 8/1978 | Banks et al. |
| 4,417,905 | A | 11/1983 | Banks et al. |
| 4,631,182 | A | 12/1986 | Tottrup et al. |
| 4,824,658 | A | 4/1989 | Karafian et al. |
| 4,919,844 | A | 4/1990 | Wang |
| 5,264,202 | A | 11/1993 | Snyder |
| 5,773,589 | A | 6/1998 | Shoji et al. |
| 5,932,141 | A | 8/1999 | Rostrop-Nielsen et al. |
| 6,335,474 | B1 | 1/2002 | Ostberg et al. |
| 2003/0009943 | A1* | 1/2003 | Millet et al. ............ 48/198.3 |
| 2003/0021748 | A1* | 1/2003 | Hwang et al. ............ 423/652 |
| 2004/0142817 | A1* | 7/2004 | Park et al. ............... 502/335 |

FOREIGN PATENT DOCUMENTS

| | | |
|---|---|---|
| EP | 0 650 950 A | 5/1995 |
| EP | 0 936 183 A2 | 8/1999 |
| EP | 0 982 266 A2 | 3/2000 |
| EP | 1 077 198 A | 2/2001 |
| EP | 1 116 689 A | 7/2001 |
| EP | 1 188 713 A | 3/2002 |
| GB | 2 311 790 A | 10/1997 |
| WO | WO 99/48805 | 9/1999 |

OTHER PUBLICATIONS

Hegarty, et al., "Syngas Production from Natural Gas Using ZrO2-Supported Metals," Catalysis Today, 42, 225-232 (1998).
Choudhary, et al., "Simultaneous Steam and CO2 Reforming of Methane to Syngas Over NiO/MgO/SA-5205 in Presence and Absence of Oxygen," Applied Catalysis, 168, 33-46 (1998).

* cited by examiner

*Primary Examiner*—Wayne Langel
(74) *Attorney, Agent, or Firm*—Bryan C. Hoke, Jr.

(57) ABSTRACT

A process for prereforming natural gas containing higher hydrocarbons and methane, includes providing a reactor having a nickel catalyst; providing steam, hydrogen, and natural gas containing higher hydrocarbons and methane to the reactor; adding an oxidant to the feedstock, wherein the oxidant provides oxygen in an amount less than the amount required to partially oxidize all higher hydrocarbons to a mixture of carbon monoxide and hydrogen; reacting the oxidant with higher hydrocarbons; and forming a gaseous mixture containing methane, carbon monoxide, carbon dioxide, steam and hydrogen substantially free of higher hydrocarbons and oxygen. The gaseous mixture can be reformed. An apparatus for performing the process includes a reactor; a feedstock source containing steam, hydrogen, and natural gas comprising higher hydrocarbons and methane; an oxidant source; valves and pipes connecting the natural gas source, the oxidant source and the reactor; and a nickel-containing catalyst within the reactor.

15 Claims, No Drawings

PROCESS FOR IMPROVING PREREFORMING AND REFORMING OF NATURAL GAS CONTAINING HIGHER HYDROCARBONS ALONG WITH METHANE

BACKGROUND OF THE INVENTION

The present invention relates to prereforming and reforming of natural gas containing higher hydrocarbons along with methane. More specifically, the invention relates to a process that improves the overall efficiency of reforming plants with and without prereformers that have feed streams comprising steam, hydrogen, and natural gas containing higher hydrocarbons along with methane.

Steam Reforming:

The steam-methane reforming process is routinely used in the chemical processing industry to produce pure hydrogen or a synthesis gas comprising a mixture of hydrogen and carbon monoxide from natural gas. The reforming process is generally carried out at a high temperature and pressure to facilitate reaction between the steam and methane in the presence of a nickel catalyst supported on alumina or another suitable material.

Several improvements have been made in recent years to improve the overall process economics of the steam-methane reforming process. Specifically, research has focused on recovering waste heat from the process and developing coke resistant nickel-based catalysts. The most notable improvement in the reforming process has been the incorporation of a prereformer for converting (1) substantially all of higher hydrocarbons present in the natural gas to a mixture of methane, carbon oxides, and hydrogen and (2) a part of methane present in the natural gas to carbon oxides and hydrogen. A prereformer that is properly integrated into the reforming process can offer numerous benefits, including: (1) reducing the possibility of coke formation on the main reformer catalyst by converting most of the heavier hydrocarbons present in the feed stream; (2) reducing the load on the main reformer catalyst by converting a part of the methane present in the feed stream; (3) reducing the ratio of steam to natural gas required for the reforming reaction, (4) providing flexibility in processing natural gas feed from different sources; (5) providing a luxury of preheating the gaseous feed mixture to a higher temperature prior to introducing it into the main reformer; and (6) increasing the life of both the reforming catalyst and tubes. The numerous benefits of using a prereformer are widely known.

Prereforming:

Generally, the selection of prereformer operating conditions has been limited by the potential of carbon formation on the catalyst, which deteriorates both the catalyst particles and the catalytic activity, balanced with concerns for the efficiency of the prereformer itself. For a given natural gas feedstock containing higher hydrocarbons along with methane, the prereformer must be operated within a certain temperature window to avoid coke formation on the catalyst. It is well known that the catalytic activity will drop if the operating temperature is (1) above the upper temperature limit due to whisker-type carbon formation, and (2) below the lower temperature limit due to formation of gum-type carbon on the catalyst. Therefore, it is desirable to select an operating temperature that is neither too high nor too low to avoid deactivation of the prereforming catalyst by coke formation. It is also desirable from the thermal efficiency point of view to operate the prereformer at as high a temperature as possible without forming coke on the prereforming catalyst.

The development of a suitable catalyst has recently been a focus of prereformer technology. The nature of the catalyst used in the prereformer depends upon the composition of the gas feed mixture, which comprises a mixture of steam, hydrogen and natural gas containing higher hydrocarbons along with methane. More specifically, the commonly used nickel-based catalysts can only be used if there is some amount of hydrogen present in the feed gas mixture. It is well known that a nickel-based catalyst is inactive in an oxidized form for converting hydrocarbons including higher hydrocarbons and methane, and therefore must be reduced or activated with a reducing gas such as hydrogen gas to convert higher hydrocarbons and methane. On the other hand, a precious metal-based catalyst can be used to convert a majority of higher hydrocarbons present in the natural gas regardless of whether there is hydrogen present in the mixed gas feed mixture. This is because a precious metal-based catalyst is active even in the absence of a reducing gas such as hydrogen, and therefore does not require reduction or activation.

The operating condition and catalyst limitations discussed above, as well as efficiency concerns, have been the center of research regarding prereforming and reforming of natural gas. Various techniques to improve prereforming and reforming of natural gas have involved the use of different temperatures and pressures, different percentages of nickel and other materials in the catalyst, catalyst placement, varying steam to carbon ratios, and heat exchange with hot waste streams. See, e.g., U.S. Pat. Nos. 3,988,425; 4,104,201; 4,417,905; 4,631,182; 4,824,658; 4,919,844; 5,264,202; 5,773,589; and 5,932,141. However, despite these attempted improvements to the prereforming and reforming of natural gas, the reforming process still has problems with rapid deactivation of precious metal-based or nickel-based prereforming catalysts, probably due to coke formation, catalyst stability, or some other factors.

Partial Oxidation:

Partial oxidation is a well known method of producing a mixture of hydrogen and carbon monoxide. Although operating conditions, composition of feed gas mixture, and catalysts used in steam-methane reforming and partial oxidation processes are substantially different, a few common trends have emerged. Research has focused on the possibility of reducing high heat generation and coke formation in partial oxidation of natural gas processes by adding steam to the feed stream. Likewise, research has focused on the possibility of using oxygen to improve the overall performance of the steam-methane reforming process. See, e.g., EP 0936183 (adds 0.55 moles of oxygen per mole of hydrocarbon); EP 0982266 (steam added must be higher than the oxygen added to reaction mixture); and WO 99/48805 (adding oxygen containing gas, and optionally steam, in the amount of 0.55 to 0.90 moles of oxygen per mole of hydrocarbon).

Reforming of Methane with Carbon Dioxide:

Reforming of natural gas or methane with carbon dioxide can also produce synthesis gas, or a mixture of hydrogen and carbon monoxide. This process, however, is plagued by severe catalyst deactivation by coke formation. It is well known that this deactivation problem can be overcome by combining a partial oxidation reaction with the reforming reaction. Several papers have described the combination of the exothermic partial oxidation reaction with the reforming reaction to provide a thermally neutral process to produce synthesis gas. This process uses 0.25 to 0.6 moles of oxygen per mole of methane and a temperature ranging from 700 to 800° C.

Oxy-Steam Reforming of Natural Gas:

Synthesis gas can also be produced by oxy-steam reforming of natural gas. The amount of oxygen added in the oxy-steam reforming process varies from 0.10 to 0.50 moles of oxygen per mole of natural gas or methane at a temperature between 750 to 850° C. Although the impact of adding oxygen on overall conversion of methane and product selectivity in a steam-methane reforming process is widely known, the same is not true of information regarding selective conversion of heavier hydrocarbons with the addition of oxygen at pre-reforming temperatures that are considerably lower than 800° C. See, e.g., Hegarty et al., "Syngas Production from Natural Gas Using $ZrO_2$-Supported Metals," Catalysis Today, 42, 225-232 (1998) and Choudhary et al., "Simultaneous Steam and $CO_2$ Reforming of Methane to Syngas Over NiO/MgO/ SA-5205 in Presence and Absence of Oxygen," Applied Catalysis, 168, 33-46 (1998).

U.S. Pat. No. 6,335,474 discloses a process for prereforming an oxygen-containing natural gas. According to this patent, a hydrocarbon feedstock with a content of higher hydrocarbons and oxygen is catalytically prereformed with a precious metal catalyst selected from Group VIII of the Periodic Table. The precious metal catalyst is claimed to be active in oxidation of hydrocarbons to carbon oxides and conversion of higher hydrocarbons to methane. While U.S. Pat. No. 6,335,474 teaches the use of a small amount of oxygen to activate the higher hydrocarbons without completely combusting them to carbon dioxide and water, or partially oxidizing them to carbon monoxide and hydrogen, there are several situations where the process would not be operable. For example, the patent is silent about using a non-noble metal catalyst. A non-noble metal catalyst, such as a nickel-based catalyst, would not work in the conditions described in the patent because of the absence of hydrogen. Furthermore, the method of this patent would not work if hydrogen were present because of preferential reaction of oxygen with hydrogen in the presence of a precious metal catalyst.

Accordingly, it is desired to provide a process that improves the overall efficiency of reforming plants with and without prereformers that have feed streams comprising hydrogen, steam, and natural gas containing higher hydrocarbons along with methane, wherein said process does not substantially suffer from the aforementioned deficiencies of other processes.

All references cited herein are incorporated herein by reference in their entireties.

BRIEF SUMMARY OF THE INVENTION

This invention provides a process for prereforming a feedstock, said process comprising: providing a reactor having a catalyst, wherein the catalyst contains an amount of nickel effective to catalyze the prereforming; introducing the feedstock into the reactor, wherein the feedstock comprises steam, hydrogen, and natural gas containing higher hydrocarbons along with methane; adding an oxidant to the feedstock, wherein the oxidant provides oxygen in an amount insufficient to partially oxidize all of the higher hydrocarbons to a mixture of carbon monoxide and hydrogen; and reacting the oxidant with higher hydrocarbons in the feedstock to provide a gaseous mixture containing methane, carbon monoxide, carbon dioxide, steam and hydrogen, wherein said gaseous mixture is substantially free of higher hydrocarbons and oxygen, to thereby prereform the feedstock.

Further provided is an apparatus adapted to perform the foregoing process, said apparatus comprising: a reactor, a feedstock source comprising steam, hydrogen, and natural gas containing higher hydrocarbons along with methane; an oxidant source; valves and pipes connecting the feedstock source, the oxidant source and the reactor; and a nickel-containing catalyst within the reactor.

DETAILED DESCRIPTION OF THE INVENTION

The present invention involves prereforming of natural gas containing higher hydrocarbons along with methane, using steam, hydrogen, and an oxidant in the presence of a nickel catalyst. In particular, the invention involves the addition of a small amount of an oxidant such as air or oxygen to the feed stream comprising steam, hydrogen, and natural gas containing higher hydrocarbons along with methane. The term "natural gas" as used herein denotes a gas stream containing higher hydrocarbons along with methane. The term "higher hydrocarbons" as used herein denotes hydrocarbons heavier than methane such as ethane, propane, butane, etc.

The addition of an oxidant provides several improvement opportunities for reforming of natural gas plants with prereformers. These improvement opportunities include: (1) replacing an expensive high nickel containing prereforming catalyst with a relatively less expensive, conventional, low-nickel containing catalyst in a prereformer, (2) increasing the life of the prereforming catalyst, (3) converting most of the higher hydrocarbons and a part of methane present in the feed natural gas stream in the prereformer, (4) increasing prereforming operating temperature, (5) reducing the load on the main reformer and concomitantly increasing the life of both the reforming tubes and the reforming catalyst, and (6) increasing reformer throughput.

The addition of an oxidant also provides improvement opportunities for reforming plants without prereformers. These improvement opportunities include: (1) more efficient conversion of higher hydrocarbons present in the feed natural gas stream in the top portion of the reformer, (2) increasing the life of the reforming catalyst, (3) reducing the chances of reforming catalyst deactivation by coke formation, and (4) increasing the reformer throughput.

The reforming of hydrocarbons, particularly the reforming of natural gas to produce hydrogen, is well known in the prior art. The reforming reaction is generally represented by the following equation:

$$CH_4 + 2H_2O \rightarrow CO_2 + 4H_2 \qquad (1)$$

When reforming natural gas containing higher hydrocarbons along with methane, the first step is the reaction of the higher hydrocarbons ($C_nH_m$ where n>1). Generally, the higher hydrocarbons are converted to methane and carbon oxides in the presence of a catalyst or partially oxidized by reacting with oxygen to form carbon monoxide and hydrogen, again in the presence of a catalyst, prior to the reforming reaction. The partial oxidation reaction is generally represented by the following equation:

$$C_nH_m + \tfrac{1}{2}nO_2 \rightarrow nCO + \tfrac{1}{2}mH_2 \qquad (2)$$

This reaction can be considered irreversible for all higher hydrocarbons (n>1) and all higher hydrocarbons are completely converted provided sufficient catalyst activity exists.

The natural gas containing higher hydrocarbons along with methane is generally converted to an intermediate stream comprising a mixture of hydrogen, carbon monoxide, carbon dioxide, water, methane, and a minor part of unreacted higher hydrocarbons. This stream is subsequently reformed in a reformer and treated further in shift reactors to produce a final product, which comprises predominantly hydrogen and carbon dioxide with residual impurity. These reactions are represented by the following equations:

$$CH_4 + H_2O \rightarrow CO + 3H_2 \qquad (3)$$

$$CO + H_2O \rightarrow CO_2 + H_2 \qquad (4)$$

The natural gas containing higher hydrocarbons along with methane entering the prereformer is generally pretreated first in a desulfurization unit to remove sulfur, which is known to poison both precious metal based and nickel based prereformer catalysts. In order to remove sulfur efficiently from the natural gas, the feed stream is mixed with up to 5% hydrogen to keep the desulfurization catalyst in a reduced and active form and to hydrodesulfurize natural gas. In some cases, the amount of hydrogen added to the feed stream can be higher than 5%. The hydrogen mixed with the feed stream is recycled from the hydrogen recovery and purification steps in a reforming plant. As a result, a feed stream entering a prereformer contains hydrogen in addition to natural gas containing higher hydrocarbons along with methane. Therefore, it is important that the prereforming process is operable in the presence of hydrogen. This invention uses an added oxidant to bring many benefits to the conventional prereforming and reforming processes, while the use of a nickel catalyst allows the invented prereforming process to operate in the presence of hydrogen in the feed stream.

The prereforming reaction of this invention can be performed in a prereforming reactor of a plant with a prereformer or in a reforming reactor of a plant without a prereformer. The prereforming reactor used in this invention can be similar to the one commonly used for prereforming natural gas. The prereforming reactor is preferably operated in an adiabatic mode at a pressure ranging from 100 to 600 psig and feed gas inlet temperature varying from 300 to 600° C. If a preforming reactor is not available, the prereforming reaction of this invention can be performed in the top portion of a conventional reforming reactor. The reforming reactor according to this invention is preferably operated at a pressure ranging from 100 to 600 psig and feed gas inlet temperature varying from 400 to 650° C. The preferred steam to carbon ratio used in the prereforming process of this invention can vary from about 1.5 to about 3. The amount of nickel present in the nickel catalyst is effective to catalyze the prereforming and/or reforming reactions. Prereforming nickel catalysts are typically commercially available between approximately 25-80 wt % nickel. Reforming nickel catalysts are typically commercially available with between approximately 10-25 wt % nickel. However, a catalyst with any weight percent of nickel may be used in this process if the nickel catalyst is active in the conversion of higher hydrocarbons and a part of methane present in natural gas to carbon oxides, methane and hydrogen. A nickel catalyst containing 1 to 25 wt % nickel is particularly suitable for the prereforming process of this invention. More specifically, a nickel catalyst containing 5 to 25 wt % nickel is most preferable for the prereforming process of this invention. The nickel catalyst can be supported on alumina, calcium aluminate or any other suitable support. It can also be promoted with alkali to protect against carbon deposition.

The feedstock to the prereforming process of this invention comprises steam, hydrogen, and natural gas containing higher hydrocarbons along with methane. Natural gas preformed and reformed in this invention can be similar to that commercially available in the market. It is pretreated in a desulfurization unit to remove sulfur, which is known to poison both precious metal and nickel based catalysts. It can contain impurities in the form of higher hydrocarbons (heavier than methane) such as ethane, propane, butane, etc. Typically, the concentration of methane in natural gas can vary varies from about less than 1% to about 15%. The concentration of ethane in natural gas typically varies from about 0.1% to about 10%. Likewise, the concentration of propane typically varies from about 0.1% to 5% and that of butane from about 0.1% to about 2%.

Hydrogen is generally present in the feed stream from the desulfurization step, and hydrogen is necessary to keep the nickel catalyst in a reduced and active form. Nickel catalysts are inactive in an oxidized form for converting higher hydrocarbons as well as methane. The catalyst must be reduced or activated with a reducing gas such as hydrogen gas to convert higher hydrocarbons and methane. As a result, some amount of hydrogen must be present in the feed gas mixture to use a nickel-based catalyst for prereforming process of this invention. An oxidant, preferably oxygen or air, is added to the feed stream to the prereforming process of this invention. The feed stream can be preheated to a temperature varying from 300 to 600° C. and prereformed in a prereformer of a plant with a prereformer. It can be preheated to a temperature varying from 400 to 650° C. and prereformed in the top portion of reformer of a plant without a prereformer.

The prereforming reaction and life of a prereforming or reforming catalyst can be greatly improved by activating and converting the higher hydrocarbons present in the feed stream to carbon oxides, hydrogen and methane by adding a small amount of oxidant to the feed stream. This is because the nickel catalyst does not promote a rapid reaction between the hydrogen and oxygen and is in reduced and active form to convert higher hydrocarbons. This oxidant is preferably air or oxygen, and the amount of oxidant added to the feed stream depends on the nature and amount of higher hydrocarbons present in the feed stream. More specifically, the amount of oxidant added to the feed stream provides less oxygen than required to partially oxidize all of the higher hydrocarbons to a mixture of carbon monoxide and hydrogen. The amount of oxygen provided is preferably less than one half of the amount required to partially oxidize all of the higher hydrocarbons. The amount of oxygen provided is more preferably less than one fourth of the amount required to partially oxidize all of the higher hydrocarbons.

The oxygen present in the added oxidant reacts selectively with the higher hydrocarbons present in the natural gas in the presence of the nickel catalyst. This reaction forms hydrocarbon-based free radicals and facilitates conversion of higher hydrocarbons along with a part of methane with steam. The resulting stream contains a mixture of methane, carbon monoxide, carbon dioxide, steam, and hydrogen. The resulting stream is substantially free of higher hydrocarbons and oxygen. For the purposes of this process, the expression "substantially free" means that the stream contains no more than about 0.001% of oxygen, more preferably no more than about 0.0005% of oxygen by weight. It also means that the stream contains no more than about 0.15% higher hydrocarbons by weight, more preferably no more than about 0.05% higher hydrocarbons by weight. If the prereforming reaction is carried out in a prereformer, the resulting stream is recovered and reformed further in a reformer to produce hydrogen and carbon monoxide rich stream. A commercially available high-nickel containing catalyst can be used for the prereforming reaction in the presence of an added oxidant. Preferably, a low-nickel containing commercial reforming catalyst can be used for the prereforming reaction in the presence of an added oxidant to improve the overall process economics. The substantial absence of higher hydrocarbons in the feed stream to the reformer will reduce the load on the reformer and therefore increase the life of both the reforming tubes and the reforming catalyst, as well as increase reformer throughput.

If the prereforming reaction is carried out in a reformer without a preformer, the reforming reactor comprises an upper portion adapted to receive a feedstock comprising steam, hydrogen, an added oxidant, and a natural gas containing higher hydrocarbons along with methane. The upper and lower portions of the reforming reactor are packed with a conventional low-nickel containing nickel catalyst. The prereforming process described in this invention more efficiently converts the higher hydrocarbons present in the feed stream in the upper portion of the reactor. The resulting product stream remains in the reactor and is further reformed to produce a hydrogen and carbon monoxide rich stream.

The apparatus adapted to perform the invented process comprises a reactor, a catalyst, and a feedstock inlet. If the reactor is a prereformer, the reactor will also contain an outlet for the resulting stream. If the reactor is a reformer, the resulting stream will remain in the reactor, and will be reformed in the lower portion of the reforming reactor.

EXAMPLES

The invention will be illustrated in more detail with reference to the following Comparative Examples illustrating problems solved by the invention, but it should be understood that the present invention is not deemed to be limited thereto.

Comparative Example 1

Reforming of natural gas in the form of pure methane with steam was carried out in a microreactor in the presence of a nickel catalyst, which is conventionally used for reforming natural gas. The catalyst was a commercially available reforming catalyst containing about 24% nickel as nickel oxide. It was promoted with an alkaline material. The catalyst was ground to about 0.35 mm particles, diluted with inert alumina particles with similar size, and loaded into a microreactor. The amount of nickel catalyst loaded into the reactor was about 0.04 g. The nickel catalyst was not reduced prior to loading into the microreactor. The microreactor was placed in a three-zone electrically heated furnace to maintain substantially isothermal temperature profile in the reactor. The reactor was heated to an operating temperature of about 650° C. under flowing inert nitrogen gas with a flow rate of 2000 sccm. The flow rate of inert nitrogen was maintained for 2 hours after reaching 650° C. to stabilize the temperature. A flow rate of 1000 sccm pure methane and 3000 sccm steam was commenced and the flow rate of nitrogen was discontinued to start reforming natural gas. No noticeable conversion of natural gas was noted even after operating the reactor for several hours. This example showed that a nickel-based reforming catalyst in an oxidized form (or not reduced prior to steam-methane reforming reaction) is inactive for reforming or prereforming natural gas.

Comparative Example 2

The reforming reaction described in Comparative Example 1 was repeated using the same amount of catalyst, flow rate of gases, and operating procedure with the exception of using 700° C. temperature instead of 650° C. Once again, no noticeable conversion of natural gas was noted even after operating the reactor for several hours. This example showed that a nickel-based catalyst in an oxidized form (or not reduced prior to steam-methane reforming reaction) is inactive for reforming or prereforming natural gas.

Comparative Example 3

The reforming reaction described in Comparative Example 1 was repeated using the same amount of catalyst, flow rate of gases, and operating procedure. The flow rate of 1000 sccm pure methane and 3000 sccm steam was maintained for several hours even though there was no noticeable conversion of natural gas. A hydrogen flow rate of 50 sccm was initiated through the reactor while maintaining 1000 sccm of pure methane and 3000 sccm of steam flow after close to 50 hours of continuous operation. The natural gas was noted to start reacting immediately after initiating the flow rate of hydrogen. The conversion of methane reached a steady state value of about 7% within 8-10 hours of initiating hydrogen. This example showed that a small amount of hydrogen needed to be present in the reaction mixture for the nickel-based reforming catalyst to be active for the reforming or prereforming of natural gas.

Comparative Example 4

The reforming reaction described in Comparative Example 1 was repeated using a slightly different procedure. The reactor was heated to an operating temperature of 650° C. under a mixture of 1000 sccm nitrogen and 1000 sccm hydrogen. The flow rate of the nitrogen and hydrogen mixture was maintained for 2 hours after reaching 650° C. to reduce the catalyst. A flow rate of 1000 sccm pure methane and 3000 sccm steam was commenced, and the flow rate of nitrogen was discontinued. The flow rate of hydrogen was reduced to 300 sccm from 1000 sccm at the same time. There was an instantaneous reaction between steam and natural gas. The conversion of natural gas in the beginning was very high, but it reached a steady state value of 7% after a few hours. This example showed that the nickel-based reforming catalyst needed to be reduced for it to be active for reforming or prereforming natural gas.

Comparative Example 5

Reforming of natural gas in the form of pure methane with steam was carried out in a microreactor in the presence of a nickel catalyst, which is conventionally used for reforming natural gas. The catalyst was a commercially available reforming catalyst containing about 24% nickel as nickel oxide. It was promoted with an alkaline material. The catalyst was ground to about 0.35 mm particles, diluted with inert alumina particles with similar size, and loaded into a microreactor. The amount of catalyst loaded into the reactor was about 0.64 g. The nickel catalyst was not reduced prior to loading into the microreactor. The microreactor was placed in a three-zone electrically heated furnace to maintain a substantially isothermal temperature profile in the reactor. The reactor was heated to an operating temperature of about 525° C. under a mixture of 1000 sccm nitrogen and 1000 sccm hydrogen. The flow rate of nitrogen and hydrogen was maintained for 2 hours after reaching 525° C. to reduce the catalyst. A flow rate of 1000 sccm methane and 3000 sccm steam was commenced, and the flow rate of nitrogen was discontinued. The flow rate of hydrogen was reduced to 50 sccm from 1000 sccm at the same time. There was an instantaneous reaction between steam and natural gas. The conversion of natural gas in the beginning was very high, but it reached a steady state value of about 9% after a few hours. This example showed that the nickel-based reforming catalyst needed to be reduced and a small amount of hydrogen needed to be present in the reaction mixture for it to be active for reforming or prereforming natural gas.

Comparative Example 6

Prereforming of natural gas in the form of pure methane with steam was carried out in a microreactor in the presence of a nickel catalyst, which is conventionally used for reforming natural gas. The catalyst was a commercially available reforming catalyst containing about 24% nickel as nickel oxide. It was promoted with an alkaline material. The catalyst was ground to about 0.35 mm particles, diluted with inert alumina particles with similar size, and loaded into a microreactor. The amount of catalyst loaded into the reactor was about 0.64 g. The nickel catalyst was not reduced prior to loading into the microreactor. The microreactor was placed in a three-zone electrically heated furnace to maintain a substantially isothermal temperature profile in the reactor. The reactor was heated to an operating temperature of about 525° C. under flowing inert nitrogen gas with a flow rate of 2000 sccm. The flow rate of nitrogen was maintained for 2 hours after reaching 525° C. to stabilize the temperature. A flow rate of 1000 sccm methane and 3000 sccm steam was commenced, and the flow rate of nitrogen was discontinued to start reforming natural gas. No noticeable conversion of natural gas was noted even after operating the reactor for several hours. This example clearly showed that a nickel-based prereforming catalyst in an oxidized form (or not reduced prior to steam-methane reforming reaction) is inactive for prereforming natural gas.

Comparative Example 7

The prereforming reaction described in Comparative Example 6 was repeated using a slightly different operating procedure. The reactor was heated to an operating temperature of about 525° C. under a mixture of 1000 sccm nitrogen and 1000 sccm hydrogen. The flow rate of the nitrogen and hydrogen mixture was maintained for 2 hours after reaching 525° C. to reduce the catalyst. A flow rate of 1000 sccm methane and 3000 sccm steam was commenced, and the flow rate of nitrogen was discontinued. The flow rate of hydrogen was reduced to 50 sccm from 1000 sccm at the same time. There was an instantaneous reaction between the steam and natural gas. The conversion of natural gas in the beginning was very high, but it reached a steady state value of about 10% after a few hours. This example clearly showed that the nickel-based prereforming catalyst needed to be reduced and a small amount of hydrogen needed to be present in the reaction mixture for it to be active for prereforming natural gas.

While the invention has been described in detail and with reference to specific examples thereof, it will be apparent to one skilled in the art that various changes and modifications can be made therein without departing from the spirit and scope thereof.

The invention claimed is:

1. A process for prereforming a feedstock, said process comprising:
   providing a reactor having a catalyst, wherein the catalyst contains an amount of nickel effective to catalyze the prereforming;
   providing the feedstock in the reactor, wherein the feedstock comprises steam, hydrogen, and natural gas containing higher hydrocarbons along with methane;
   adding an oxidant to the feedstock, wherein the oxidant provides oxygen in an amount insufficient to partially oxidize all of the higher hydrocarbons to a mixture of carbon monoxide and hydrogen; and
   reacting the oxidant with the higher hydrocarbons in the feedstock to provide a gaseous mixture containing methane, carbon monoxide, carbon dioxide, steam and hydrogen, wherein said gaseous mixture is substantially free of higher hydrocarbons and oxygen, to thereby prereform the feedstock.

2. The process according to claim 1, wherein the oxidant is air or oxygen.

3. The process according to claim 1, wherein the oxidant provides less than one-half of the oxygen required to partially oxidize all of the higher hydrocarbons to a mixture of carbon monoxide and hydrogen.

4. The process according to claim 1, wherein the oxidant provides less than one-fourth of the oxygen required to partially oxidize all of the higher hydrocarbons to a mixture of carbon monoxide and hydrogen.

5. The process according to claim 1, wherein the reactor is a reformer, and the prereforming process is carried out in a top portion of the reformer.

6. The process according to claim 1, wherein the reactor is a prereformer.

7. The process according to claim 6, wherein the reactor is an adiabatic reactor.

8. The process according to claim 7, wherein the reactor is operated at a pressure of 100 to 600 psig, and the feedstock is heated to a temperature of 300 to 600° C. before the feedstock is provided to the reactor.

9. The process according to claim 8, wherein the oxidant provides less than one-half of the oxygen required to partially oxidize all of the higher hydrocarbons to a mixture of carbon monoxide and hydrogen.

10. The process according to claim 8, wherein the oxidant provides less than one-fourth of the oxygen required to partially oxidize all of the higher hydrocarbons to a mixture of carbon monoxide and hydrogen.

11. The process according to claim 5, wherein the reactor is operated at a pressure of 100 to 600 psig and the feedstock is heated to a temperature of 400 to 650° C. before the feedstock is provided to the reactor.

12. The process according to claim 11, wherein the oxidant provides less than one-half of the oxygen required to partially oxidize all of the higher hydrocarbons to a mixture of carbon monoxide and hydrogen.

13. The process according to claim 11, wherein the oxidant provides less than one-fourth of the oxygen required to partially oxidize all of the higher hydrocarbons to a mixture of carbon monoxide and hydrogen.

14. The process of claim 1, wherein the amount of nickel in the catalyst is at least 1 wt %.

15. The process of claim 1, wherein the gaseous mixture is reformed.

* * * * *